Sept. 30, 1969 W. R. RUST ET AL 3,470,360

STATIC MEMORY PUNCHED CARD READER

Filed June 6, 1966 2 Sheets-Sheet 1

STATIC MEMORY PUNCHED CARD READER

Filed June 6, 1966 2 Sheets-Sheet 2

United States Patent Office 3,470,360

Patented Sept. 30, 1969

3,470,360

STATIC MEMORY PUNCHED CARD READER

Wallace R. Rust, 523 Britton Road, Rochester, N.Y. 14616, and Robert J. Whitman, 2300 E. Lake Road, Conesus, N.Y. 14435

Filed June 6, 1966, Ser. No. 555,443
Int. Cl. G06k 7/04
U.S. Cl. 235—61.11 4 Claims

ABSTRACT OF THE DISCLOSURE

A machine for electrically sensing the positions of the holes in a conventional punched card. A movable platen presses the punched card against a fixed board through which feeler pins extend, there being a pin in each position where a hole might be punched in the card, according to the standard positions normally used in such a card. On the opposite side of the board from the card, each feeler pin cooperates with its own individual resilient electrical switch arm normally engaging a fixed contact, and presses the resilient arm away from its associated fixed contact if the feeler pin is displaced by a card having no hole punched in the particular location corresponding to the feeler pin. If the card does have a hole in this location, then the pressing of the card against the board does not displace this feeler pin, and consequently does not open the electric switch associated with this particular feeler pin, this individual switch remaining closed so as to complete an electric circuit to the desired indicating mechanism such as an electric lamp.

This invention relates to a reader for retrieving information or data stored on punched cards.

Punched cards are being used with increasing frequency for the retention of data and for automatic machine programming. These cards store information by way of critically located holes or edge notches. Information is retrieved from punched cards by devices known as card readers. These devices function to give an electrical signal for each hole or notch in a card.

Punched card readers are classified into two general types: the serial read-out type and the static memory type. The serial read-out type scans a card in a systematic manner, whereby the information on the card is obtained in succeeding discriminate groups. The static memory type of punched card reader presents simultaneously all of the information on the card and for as long as the card is in the reader.

Static memory readers must contain some sort of hole sensing means for every possible hole position in the cards to be read. In one type of punched card, which has 80 columns with each column having 12 hole positions (or 12 rows with each having 80 hole positions), the number of hole sensing means required is 960.

Consequently, currently available static memory readers are cumbersome and quite complex in structure and operation. Moreover, they are difficult to maintain and repair. Hence, they represent relatively large capital investments and substantial repair expenses.

An object of this invention is to provide a generally improved and more satisfactory static memory punched card reader.

Another object is to provide a static memory punched card reader of simplified, but inherently rugged, construction and of simplified operation.

These and other desirable objects may be attained in the manner disclosed as an illustrative embodiment of the invention in the following description and in the accompanying drawings forming a part hereof, in which.

Figure 1:
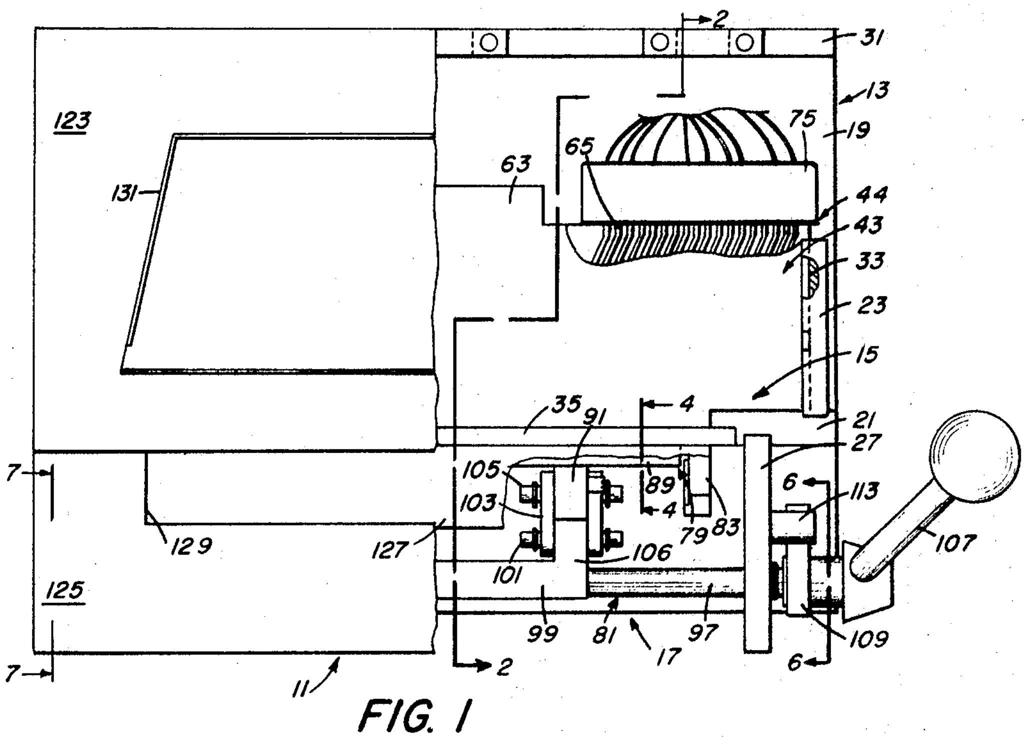
FIG. 1 is a plan view of a preferred, specific embodiment of the static memory punched card reader of this invention as the embodiment appears when in mechanical condition for reading a suitable punched card, in which view portions of exterior structures have been removed to reveal underlying interior structures.

The drawings in general illustrate a specific embodiment of an apparatus for reading a punched card having a predetermined size and shape with a first side, a second side and, relative to one of said sides, a predetermined area with at least one punched hole position.

The apparatus, broadly considered, comprises a first switch panel structure and at least a second switch panel structure. The first switch panel structure on one side has for each punched hole position a first switch contact element with a conductor extending therefrom to a terminal. The second switch panel structure has at least on one side for at least one punched hole position a second switch contact element with a conductor extending therefrom to a terminal. The two switch contact elements together form an electrical switch with at least one of the elements being movable relative to the other. The second switch panel structure is perpendicularly disposed to said side of the first switch panel structure with each pair of first and second switch contact elements being in electrical contact when the elements are in one relative position and out of electrical contact when in another relative position. Preferably, spring means are provided which establish the elements in one relative position. In one preferred embodiment the spring means are part of a relatively movable switch contact element which is a spring leaf or leg. The other side of the first switch panel structure comprises a card abutment surface against which the first side of the card in predetermined relative orientation is placed for the taking of a reading. The first switch panel structure also comprises at each hole position a passageway for a switch actuator pin, which passageway extends from the one side of the first switch panel structure to the card abutment surface.

The apparatus, in addition to the switch panel structures, comprises card placement means and for each punched hole position hole sensor, switch actuator means.

The card placement means provide a press surface longitudinally movable toward and away from the card abutment surface and generally in topographical conformity with the corresponding portion of the abutment surface for contacting the second side of the card preferably about each punched hole position when the card is against the card abutment surface.

The hole sensor, switch actuator means comprise a switch actuator pin insertable through a punched hole in the card. The pin is carried by one of the card placement means and the first switch panel structure.

When carried by the card placement means, which is not the case in the specific embodiment of FIGS. 1–7, the pin normally projects from an opening in the press surface and is carried by a spring structure whereby, if the card has no hole at the punched hole position involved, the pin is pushed into the opening by the card when the card is pressed between the press surface and abutment surface. On the other hand, if the card has a punched hole at the particular position, the pin passes through the punched hole, through the passageway therefor in the first switch panel structure, and into engagement with a relatively movable switch contact element which is moved by the pin from the one relative position to the other relative position.

Preferably, however, as in the embodiment of FIGS. 1–7, because of substantially greater ease and simplicity of construction, maintenance and operation including dependability of results, the pin is carried by the first switch panel structure. In such case the pin comprises a shank normally extending outwardly from the abutment surface at the punched hole position. The shank is insertable through a normal punched hole, but movable inwardly into the passageway therefor in the first switch panel structure by a properly oriented card without a hole at said position when the card is pressed against said surface. The length of the pin is such that when moved inwardly it moves a relatively movable switch contact element from the one relative position to the other relative position. The press surface of the card placement means has a corresponding opening to receive the shank when a card with a hole in the relevant punched hole position is being read. Preferably, there are spring means which urge the pin outwardly from the abutment surface. In a preferred embodiment the spring means are part of the relatively movable switch contact element.

This generic structure, except as noted, is present in the specific embodiment of the apparatus, shown in FIGS. 1–7.

FIGS. 1–7, in greater detail, illustrate a reader 11 adapted for the well known type of punched card or record card, which is referred to as an IBM punched card. This type of card is rectangular, has a length of about 7⅜ inches, a width of about 3¼ inches, a punched hole area covering almost the entire area of the face of the card, and within that area 80 columns of 12 rows each of punched hole positions. However, as can be seen from subsequent disclosures herein, the reader 11 is readily adapted for other types of cards without departing from the broader concepts and scope of this invention. The language "type card" as used herein refers to the type of card to which the specific reader is adapted.

STRUCTURE

The reader 11 comprises (see FIGS. 1, 2 and 3) a structural support assembly 13 on which is mounted a card contacting and punched hole detecting assembly 15, and a card placement assembly 17.

The structural support assembly 13 comprises a base plate 19 (see FIG. 2), a column board holder 21, a pair of row board holders 23 (see FIGS. 1 and 2) and 25 (see FIG. 3), a pair of shaft supports 27 (see FIGS. 1, 2 and 3) and 29 (see FIG. 7) and a cable support back panel 31. The base plate 19 is a generally rectangular plate which is normally horizontally disposed. The column board holder 21 is a generally U-shaped member perpendicularly and transversely positioned on top of the base plate 19 and fastened thereto. The row board holders 23 and 25 are plates, each of which has a pluraliy of parallel slots 33 (see FIG. 1) extending from one end to the other and spaced preferably equidistantly from one another. The row board holders 23 and 25 are mounted perpendicularly on opposite sides of the top of the base plate 19, back of the column board holder 21 and with their slots 33 parallel to the base plate 19, facing each other and in alinement. The cable support back panel 31 is a plate perpendicularly disposed on top of and at the back end of the base plate 19, and having openings through which cables can extend.

The card contacting and punched hole detecting assembly 15 comprises a first switch panel structure 35, a plurality of hole sensor, switch actuator pins 37, a plurality of buses 39 and 41 (see FIGS. 2, 4 and 5), and a plurality of second switch panel structures 43 and 44.

The first switch panel structure, referred to also as a column board, comprises a generally rectangular plate or panel of dielectric material mounted in the column board holder 21. The front side or face of the column board 35 presents a card abutment surface 45 (see FIGS. 2–5). In the embodiment shown, this surface is substantially flat. However, under broader concepts of this invention this surface can be curved. The column board 35 has a plurality of parallel, linear grooves 47 opening onto the back side of the column board and extending from one end to the other end of the board. In the embodiment shown in the drawings, the column board 35 is normally vertically disposed and the grooves 47 extend from the top end to the bottom end of the board. However, it is within the concepts of this invention for the grooves 47 to extend from one lateral end to the other lateral end of the column board 35, and it is also within the broader concepts of this invention for the column board 35 to be normally horizontally disposed and the grooves 47 to extend either from the front end to the back end of the board or from one lateral end to the other lateral end of the board. In the embodiment shown the number of grooves and spacing between the grooves correspond to the number of columns of punched hole positions on the type card and the spacing between the punched hole positions on the type card. Between the grooves 47 and at positions opposite each of the punched hole positions on the type card when it is properly placed against the card abutment surface 45 are bores 49 extending from the front side to the back side of the column board 35.

Each of the switch actuator pins 37 (see FIG. 4) comprises a generally linear shank 51 and at one end of the shank a head 53. The pins 37 are disposed in sliding fit in the bores 49 through the column board 35 with the heads 53 of the pins on the back side of the column board. The heads 53 are generally larger than the bores 49 and, with the pins in normal position, substantially abut the back side of the column board to prevent movement of the pins forwardly from this normal position. The length of the shanks 51 of each of the pins 37 is such that when the pin in each case is in its normal position a substantial portion of the front end of the shank extends outwardly from the face of the column board 35.

Each of the buses 39 and 41 (see FIGS. 4 and 5) comprises a strip 55 of conductive material having along one longitudinal edge outwardly extending projections 57 with transverse flanges 59 extending laterally and preferably on the same side of the bus. These flanges provide stationary electrical contacts and, therefore, are referred to herein as stationary contacts. The spacings between the stationary contacts 59 on laterally adjacent buses correspond to the spacings between the columns or vertical rows of punched hole positions on the type card. The opposite longitudinal edge of the strip 55 preferably has at least one prong 61.

The buses 39 and 41 are disposed in friction fit in the grooves 47 of the column board 35 with the prongs 61 press fitted in locating holes extending from the grooves further into the column board and with the stationary contacts 59 centered between the bores 49 through the column board. Each of the column grooves 47 contains at least one bus. However, in some instances the groove contains two buses with the adjacent ends being spaced from each other. The length of each of the two buses in the groove is dependent upon the electrical circuitry involved for translating the information represented by the punched holes on a type card. Where only one bus is involved, it is positioned so that there is a stationary contact 59 at least either between the top corresponding top bore 49 and top end of the column board 35 or between the corresponding bottom bore 49 and bottom end of the column board 35. This contact is a terminal for the bus. In some instances where only one bus is present in a groove 47, there can be a stationary contact 59 at both places. However, usually only one at a time is used. Where two buses are present in a groove 47, between the corresponding top bore 49 and the top end of the column board 35 there is a stationary contact 59 which functions as a terminal for the top bus 39 in the groove 47, and between the corresponding bottom bore 49 and the bottom end of the column board 35 there is a stationary contact 59 which functions as a terminal for the bottom bus 41 in the groove 47. Preferably, the buses 39 and 41 are positioned in the grooves 47 so that all of the stationary contacts 59 of all of the buses face in the same lateral direction, and so that outside surfaces thereof are in about the same plane parallel to the back of the column board as the outer ends of the heads 53 of the switch actuator pins 37 when the pins are in normal position without a card in the reader 11.

The second switch panel structures comprise at least one end row board assembly 43 and a plurality of intermediate row board assemblies 44. Each of the row board assemblies comprises a printed circuit board 63. As is well known, a printed circuit board is a rigid, self supporting panel or board of dielectric material with a thin layer of conductive material adhering to the board and extending in a plane of the board from one terminal point to another. The thin layer of conductive material is referred to as a conductor. In the specific embodiment of FIGS. 1–7, which has two end row board assemblies 43, the printed circuit board in each end row board assembly has a plurality of conductors 65 on one side of the board, the number of conductors preferably at least corresponding to the maximum number of punched hole positions in a row on the type card. Each of the intermediate row board assemblies 44 comprises a circuit board 63 having electrical conductors 65 on both sides of the board with the number of conductors on each side preferably corresponding to the maximum number of punched hole positions in a row on the type card. The conductors 65 on each of the circuit boards generally extend from terminal points in the region of the front ends of the boards to terminal points in the region of the back ends of the boards.

At the front end terminal points (see FIG. 5) the conductors 65 are generally spaced from one another according to the spacing between punched hole positions in the type card.

At the front end terminal point of each of the conductors 65 there is a spring contact 67 (see FIG. 4) which has in side view the general shape of an angle bar, there being two legs 69 and 71. Preferably these legs, when the board is out of the reader 11, are at an obtuse angle of, for example, 120°, but, when the board is in the reader without a card in position, the two legs are at about 90° so as to be in a spring stressed condition. One leg 69 is a stationary leg. It is joined to a corresponding circuit board conductor 65 and extends toward the front edge of the circuit board 63 to join the other leg 71 which extends out of the plane of the circuit board. The other leg 71 is a spring leg or movable contact, resiliently urging the head 53 of its associated pin 51 toward the board 35 if the head is displaced any substantial distance from the board, as will be readily appreciated from FIG. 4. A clamp bar 73 is positioned transversely to the circuit board 63 so as to sandwich the stationary leg 69 of each of the spring contacts 67 between it and the circuit board, and thereby help to establish and maintain the stationary leg in a relatively non-movable condition. It will be apparent from FIG. 4 that each ear or stationary contact 59 on a bus bar serves as a stationary contact for two of the resilient movable contact members 71, that is, one spring contact 71 on the lower side of the circuit board 63 next above the stationary contact 59 and one spring contact 71 on the upper side of the circuit board 63 next below the stationary contact 59. It will also be observed that each stationary contact 59 is located, in a vertical direction, substantially midway between two circuit boards 63. Likewise it will be readily seen from FIG. 4 that the thickness (in an axial direction) of each enlarged head 53 on a pin 51, is slightly less than the distance of the spring contact member 71 from the adjacent surface of the board 35, when the spring contact member is in contact with its cooperating stationary contact member 59. This insures that, unless a card presses the pin 51 axially, the switch contacts 59, 71 will be closed and will not be accidentally held open by the head 53 of the pin, but nevertheless the resilient action of the spring contact 71 will hold the head 53 substantially against the surface of the board 35, there being only a small gap.

The back end of the circuit board or row board 63 in each assembly is preferably shaped (see FIG. 1), and the terminal points of the conductors 65 are preferably arranged, so as to accommodate a slide on, circuit board edge type cable connector 75.

The row boards 63, supported at their lateral margins in the slots 33 (see FIGS. 1 and 2) of the row board holders 23 and 25, are disposed generally parallel to each other (see FIG. 2) and in planes generally perpendicular to the back side of the column board 35 and generally perpendicular to the linear grooves 47 in the column board. The row boards of the end row board assemblies 43 are positioned with the conductors generally facing toward each other. The spacing between each of the row boards 63 is generally double the spacing between each row of punched hole positions on the type card. The front edge of each row board 63 is placed next to the back side of the column board 35, whereby the spring leg or movable contact 67 biases the sensor pin 37 into its normal position while at the same time the movable leg 67 bears against the corresponding stationary contact 59.

The card placement assembly 17 in the apparatus of FIGS. 1–7 comprises a card centering structure, a platen 77, a hinged carrier 79 for the platen, and a crank mechanism 81.

Figures 2, 7:
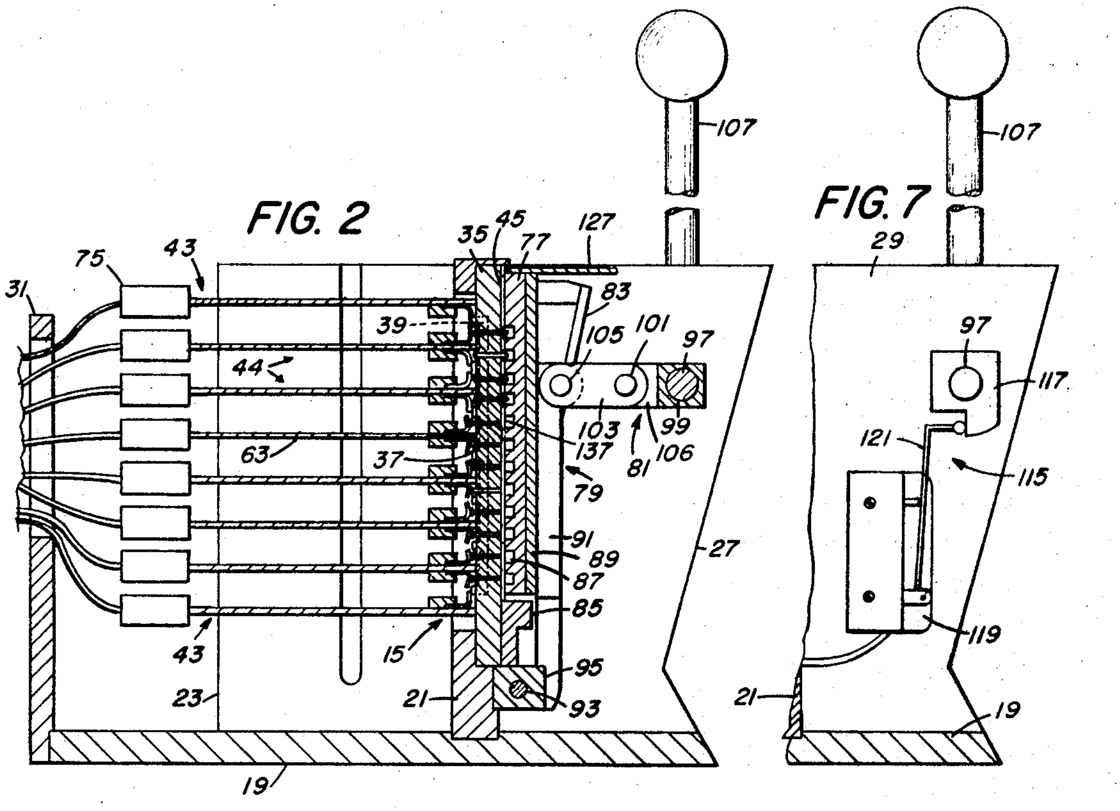
FIG. 2 is a longitudinal section of the apparatus of FIG. 1, which section has been taken as indicated by the offset sectioning plane 2—2 in FIG. 1.
FIG. 7 is a longitudinal section of the apparatus of FIG. 1, which section has been taken as indicated by the sectioning plane 7–7 in FIG. 1.
Figure 3:
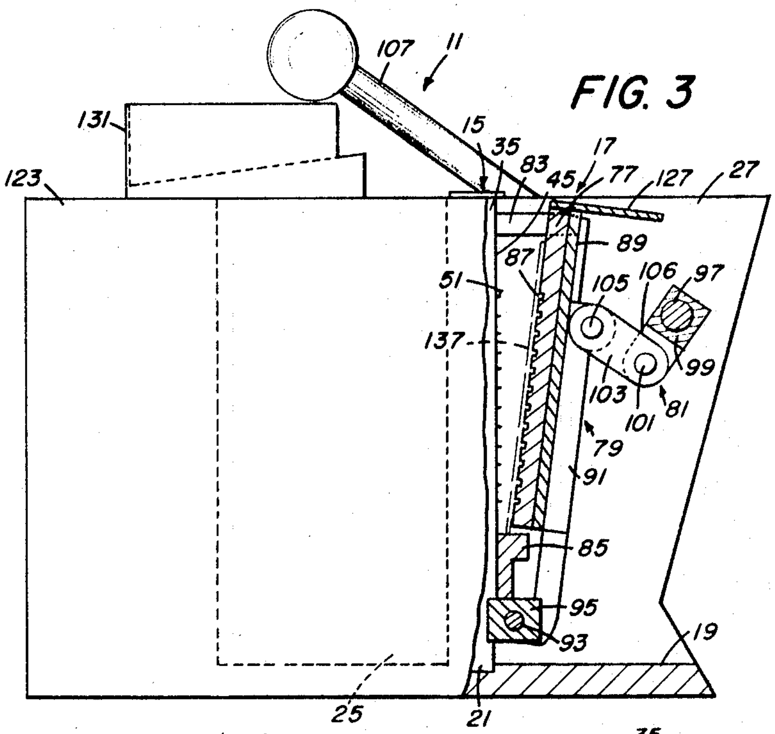
FIG. 3 is a side view of the apparatus of FIG. 1 when in mechanical condition for receiving or for removing a punched card, and with the front portion of the apparatus being longitudinally sectioned the same as in FIG. 2.
Figure 6:
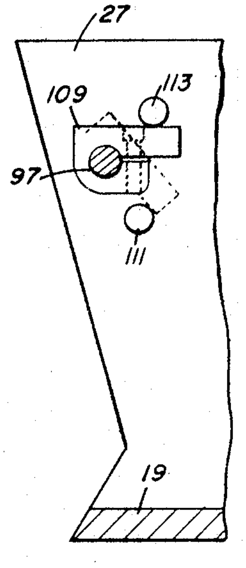
FIG. 6 is a cross-section of the apparatus of FIG. 1, which section has been taken as indicated by the sectioning plane 6—6 in FIG. 1.

The card centering structure comprises a pair of lateral guides 83 (see FIGS. 1–3) and a stop bar 85 (see FIGS. 2 and 3). The lateral guides 83 are secured to the front of the column board holder 21 adjacent each lateral end of the column board 35. They extend frontwardly from the column board holder 21 and are spaced at the card location to just accommodate between them a properly oriented type card. However, they are preferably slightly flared laterally outwardly in the region of the top ends thereof, so as to facilitate rapid insertion of type cards between them. The stop bar 85, fastened to the column board holder 21, is adjacent the bottom end of the column board 35, extends frontwardly from the column board 35 so as to provide a card supporting ledge, and is in the region between the bottom ends of the lateral guides 83.

The platen 77 is a generally rectangular plate with a plurality of parallel slots 87 (see FIGS. 2–5) on the side normally facing the face or card abutment surface 45 of the column board 35. These slots extend from one lateral end to the other lateral end of the platen and correspond in position to the rows of punched hole positions on the type card. The depth of each of the slots 87 is such that when the platen 77 is in position adjacent the card abutment surface 45 of the column board, the portions of the shanks 51 of the hole sensor pins 37 extending frontwardly from the front side of the column board 35 are within the corresponding slots without physical contact between the shanks and the platen 77.

The hinged carrier 79 for the platen comprises a platen carrier plate 89 and a pair of hinge straps or lever arms 91. The platen carrier plate 89 is a generally rectangular, transversely positioned plate to the back side of which the platen 77 is fastened. The lever arms 91 are transversely spaced, vertically disposed bars which are fastened to the front side of the platen backing plate 89, and at the lower ends thereof in the region of the card stop bar 85 they are pivotally mounted on a pivot pin 93 extending transversely from each end of a pin carrier bar 95. The pin carrier bar 95 is fastened to the front side of the column board holder 21 between the card stop bar 85 and the base plate 19 of the support structure 13. The other end of each of the lever arms 91 has a transversely lying, toggle pin bore therethrough for connecting the hinged carrier 79 to the crank mechanism 81.

The crank mechanism 81 (see FIGS. 1–3) comprises a shaft 97, a clevis 99, first toggle pins 101, links 103, second toggle pins 105, and a handle arm 107. The shaft 97 is normally transversely disposed parallel to the base plate 19. It is rotatably carried by the shaft supports 27 and 29 of the support structure 13. The clevis 99 (see FIG. 1) is a generally U-shaped part having a transversely disposed (relative to the reader 11) cross-piece with a transversely alined bore therethrough for the shaft 97. The clevis is mounted on the shaft 97 between the shaft supports 27 and 29, and is rotatable with the shaft. The arms 106 of the clevis 99 extend longitudinally backwardly toward the lever arms 91. Each of the arms 106 of the clevis 99 has a transversely lying toggle pin bore therethrough. The first toggle pins 101 are rotatably seated in these bores and extend laterally from both sides of the clevis arms 106. Each outer portion of the first toggle pins 101 has rotatably positioned thereon one end of a link 103. The other ends of the links are carried by the second toggle pins 105. The second toggle pins are rotatably disposed in the transversely lying toggle pin bores through the lever arms 91 of the hinged carrier 79, and also extend outwardly from both sides of the lever arms 91 for rotatably carrying the other ends of the links 103. The handle arm 107 is attached to one end of the shaft 97 for turning the shaft in one direction to pull the platen 77 into card receiving and removing position (open position) and for turning the shaft 97 in the opposite direction for pushing the platen 77 into card placement position (closed position).

The crank mechanism 81 also preferably comprises motion limiting means. These means (see FIGS. 1 and 6) comprise a motion check 109, an open position stop 111 and a closed position stop 113. The motion check 109 is a radially offset, longitudinally extending arm secured to the shaft 97 and rotatable therewith. The open position stop 111 and closed position stop 113 are relatively stationary elements that are transversely disposed and attached to the shaft support 27 closest to the motion check 109. The open position stop 111 is arranged so that when the platen 77 is moved to open position, the stop abuts the motion check 109 when that position is reached and stops further rotation of the shaft 97 in the direction away from the closed position. The closed position stop 113 is placed so that when the platen 77 is moved to closed position the stop abuts the motion check 109 when that position is reached and blocks further turning of the shaft 97 in the direction away from the open position.

The reader 11 also preferably comprises a master switch assembly 115 (see FIG. 7) which comprises a switch cam 117 and a normally open master switch 119 with a switch actuating lever arm 121. The shaft 97 carries the switch cam 117 in the region of the master switch 119 which is mounted on a shaft support 29. The cam 117 is arranged so that when the platen 77 is in the closed position the switch lever arm 121 is engaged by the cam and is in its switch closed position, while as soon as the platen 77 is out of its closed position the switch lever arm 121 is released from the switch closed position and the master switch 119 is in switch open condition.

The reader 11 of FIGS. 1–7, in addition to the structure just described, preferably comprises a back cover 123 and a front cover 125, which are fastened to the support structure 13, and a shield plate 127 fastened to the upper end of the platen backing plate and extending frontwardly from the platen 77. In the embodiment shown, the top of the front cover 125 has an opening 129 corresponding to the card receiving space between the column board 35 and the platen 77 when the platen 77 is in its open position. However, when the platen 77 is in its closed position, the shield plate 127 closes substantially all of the access opening 129. Also, in the embodiment shown, there is preferably provided on top of the back cover 123 a card tray 131 for holding a stack of punched cards either before or after they have been "read."

Figure 8:
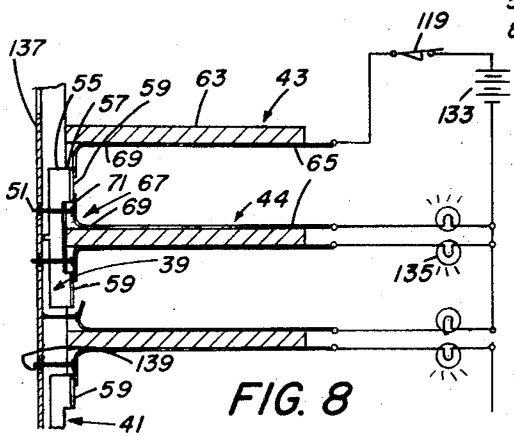
FIG. 8 is a wiring diagram of typical electrical circuits in which portions of the apparatus illustrated in FIGS. 4 and 7 are involved.

The punched card reader under normal operative conditions is connected by means of the cable connectors 75 and corresponding cables to electrical components including a source of electrical potential, such as, for example, a battery, and current responsive means such as, for example, indicator lamps, relays, transistors, and the like. FIG. 8 illustrates typical electrical circuitry for that part of the reader shown in FIG. 4. Each circuit comprises a battery 133 and the microswitch 119 connected to one end of the battery and to a conductor 65 of an end row board 63. Corresponding conductors 65 of intermediate row boards 63 are each connected to indicator lamps 135 which are electrically connected to the other end of the battery.

OPERATION

Figure 5:
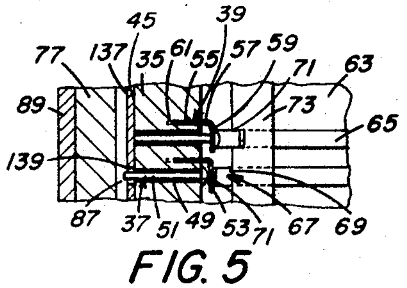
FIG. 5 is a horizontal section of a portion of the apparatus of FIG. 1, which section has been taken as indicated by the off-set sectioning plane 5—5 in FIG. 4.
Figure 4:
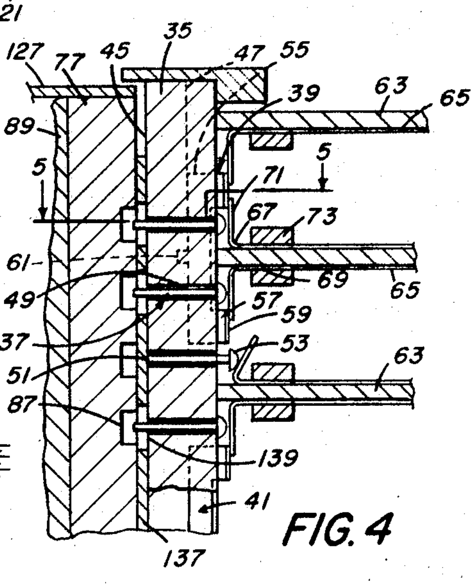
FIG. 4 is an enlarged, longitudinal section of a portion of the apparatus of FIG. 1, which section has been taken as indicated by the sectioning plane 4—4 in FIG. 1.

The reader 11 of FIGS. 1–7 is operated, when electrically connected, for example, as in FIG. 8, in the following manner. With the platen 77 in open position as in FIG. 3, in which position the microswitch 119 is open, a type card 137 with punched holes 139 in some punched hole positions and no punched holes in other punched hole positions is inserted in proper orientation through the access opening 129, and dropped into place. When the bottom edge of the card 137 has come to rest on the card stop bar 85, the handle arm 107 is pulled until the motion check 109 strikes the closed position stop 113 as in FIG. 7. At this point the microswitch cam 117 carried by the shaft 97 engages the microswitch lever arm 121 as in FIG. 6 and closes the microswitch. At the same time the card 137 is pressed by the platen 77 against the face or card abutment surface 45 of the column board 35. The hole sensor pins 37 at those positions where the card has punched holes 139 are unaffected by the card 137, as shown in FIGS. 2, 4 and 5, and the electric circuit for each of these positions is complete or closed, whereby the indicator lamps 135 for these positions are lit, as indicated in FIG. 8. On the other hand, the sensor pins 37 at those positions where the punched card 137 has no holes are pushed by the card inwardly so that the heads 53 of the sensor pins push the corresponding spring contacts 67 out of contact with the corresponding stationary contacts 59 as in FIGS. 2, 4 and 5. Consequently, the electrical circuits corresponding to these positions are opened as indicated in FIG. 8, resulting in the indicator lamps 135 in those circuits not lighting up. In such a fashion the information represented by the punched holes 139 or absence of punched holes is visually or otherwise retrieved.

Thereafter, the handle 107 is turned back until the motion check 109 strikes the open position stop 111. Substantially as soon as the platen 77 commences its pivotal travel from its closed position toward its open position, the microswitch cam 117 releases the microswitch lever arm 121, thereby opening all of the electrical circuits for each of the punched hole positions.

Although not shown, the reader 11 can have auxiliary sensor pin holes 49 in the column board 35 with auxiliary sensor pins 37 and corresponding stationary and spring contacts 59 and 67, which holes 49 are, relative to the type card, at card locations outside of the punched hole area or areas. Such auxiliary structure is useful, for example, for actuating a card counter, for indicating when a corner-cut type of card is oriented properly, and the like.

Thus, there is provided a static memory punched card reader of simple construction, simple and reliable operation, and easy and rapid repair and maintenance.

The reader 11 is readily adapted for use with any type of punched card by employing a column board 35 with sensor pin holes 49, hole sensor, switch actuator pins 37, buses 39 and stationary contacts 59, and row board assemblies 43 and 44 with conductors 65 and spring contacts 67, which are appropriate for the type of punched card. Of course, for punched cards of a type having a different size and shape, the platen 77 and spacing of the lateral guides 83 are according to that type of card.

Moreover, the mode of operation of the reader 11 can be changed so that a type card with a punched hole at a given position results in an open electrical circuit while the absence of a punched hole at that punched hole position results in a closed circuit. This is done by positioning the corresponding stationary contact 59 in back of, rather than in front of, the corresponding spring contact 67. The spacing of the stationary contact 59 from the back side of the column board is sufficient so that the spring contact 67 bearing against the head 53 of the corresponding switch actuator pin 37 in normal position is out of contact with the stationary contact 67, but in contact with it when the switch actuator pin 37 is pushed inwardly by a card not having a punched hole at that punched hole position.

In addition, the apparatus of FIGS. 1–7 can be modified within the scope of the invention so that the buses 39 are arranged, not according to columns of punched hole positions, but according to rows of punched hole positions, and the row board assemblies 43 and 44 are arranged according to columns of punched hole positions instead of rows of punched hole positions.

A major feature of advantage of the static memory reader of this invention is the ease with which it can be disassembled and assembled for repair and maintenance.

Other features, advantages and specific embodiments of this invention will be readily apparent to those in the exercise of ordinary skill in the art after reading the foregoing disclosure. Thus, for example, in one embodiment under the broader concepts of this invention, instead of a column board 35 with grooves 47 with bus bars 39 and 41, the first switch panel structure comprises a printed circuit board with bores 49 and in columns between the bores 49 lines of conductive material or foil, as it is sometimes called, which provide the stationary contacts 59 and conductors joining the stationary contacts. In another, but less preferred embodiment of the broader concepts of this invention, the structure is the same as the embodiment of FIGS. 1–7, except that the hole sensor, switch actuator pins 37 are carried by the platen 77. In this embodiment each switch actuator pin 37 is slidably disposed in a longitudinally alined opening in the platen along with a spring which biases the switch actuator pin toward the column board 35 when a card without a hole at the corresponding hole position is in place and the platen 77 is adjacent the column board 35, the pin is depressed against the bias of the spring into the longitudinally alined opening, and the contact between the corresponding stationary contact 59 and spring contact 67 is maintained. However, when a card with a hole is involved, the hole sensor, switch actuator pin is not depressed and the contact is broken.

It is seen from the foregoing disclosure that the objects and purposes of the invention are well fulfilled. It is to be understood that the disclosure is given by way of illustrative example only, rather than by way of limitation, and that without departing from the invention, the details may be varied within the scope of the appended claims.

What is claimed is:

1. A punched card reader comprising a panel board having a first face against which a punched card may be pressed and a second face substantially parallel to said first face and spaced therefrom by the thickness of the board, means for pressing a punched card against said first face, a series of feeler pins extending through the thickness of said board and movable longitudinally through such thickness, each of said pins being longer than the thickness of said board and having an enlarged head at one end adjacent said second face to limit movement of the pin in one direction to a position wherein the opposite end of the pin projects a substantial extent beyond said first face, said pins being arranged in a plurality of columns in one direction and a plurality of rows in a direction perpendicular to said columns, a series of circuit boards each lying in a plane perpendicular to said second face of said panel board, a series of stationary contacts supported from and located adjacent said second face of said panel board, and a series of individual conducting members carried by at least one surface of certain of said circuit boards, each of said individual conducting members having a resilient contact portion normally resiliently engaging one of said stationary contacts, each resilient contact portion also overlying the enlarged head of one of said pins to tend to keep such head substantially against said second face of said panel board, longitudinal pressure on such pin caused by pressing an unperforated portion of a card against the projecting opposite end of such pin serving to displace the head of such pin away from the second face of said panel board and to displace the overlying resilient contact portion away from its cooperating stationary contact.

2. A construction as defined in claim 1, wherein said second face of said panel board has a series of grooves, and wherein said stationary contacts are formed as parts of conducting members mounted in and frictionally retained in said grooves.

3. A construction as defined in claim 2, wherein said grooves run in a direction perpendicular to the planes of said circuit boards.

4. A construction as defined in claim 1, wherein there is a series of individual conducting members carried by each of two opposite surfaces of certain of said circuit boards, and each of such circuit boards is located approximately midway between two adjacent rows of pins, with the resilient contact portions of the conducting members on one surface of the circuit board overlying the heads of the pins of one row and the resilient contact portions of the conducting members on an opposite surface of the circuit board overlying the heads of the pins of an adjacent row.

References Cited

UNITED STATES PATENTS

| | | | |
|---|---|---|---|
| 2,967,916 | 1/1961 | Williams | 340—149 X |
| 3,001,699 | 9/1961 | Arthur. | |
| 3,148,251 | 9/1964 | Burke. | |
| 3,152,247 | 10/1964 | Brown. | |
| 3,294,957 | 12/1966 | Young. | |

MAYNARD R. WILBUR, Primary Examiner

THOMAS J. SLOYAN, Assistant Examiner

U.S. Cl. X.R.

200—46; 340—339